Patented Mar. 16, 1954

2,672,423

UNITED STATES PATENT OFFICE 2,672,423

COPPER RUBY GLASS

Edward M. Lobdell, Wood River, and Joseph W. Wright, Alton, Ill., assignors to Owens-Illinois Glass Company, a corporation of Ohio No Drawing. Application May 12, 1950,
Serial No. 161,728

2 Claims. (Cl. 106—52)

Our invention relates to the art of making copper ruby glass. Copper ruby glasses have been made for many years past, using batch formulas including charcoal or cream of tartar as a reducing agent. With such reducing agents, difficulties are encountered, particularly in controlling and maintaining uniformity of color. More recently this difficulty has been largely overcome by the use of a cyanogen compound, such, for example, as sodium cyanide, for a reducing agent. The use of metallic cyanogen compounds for this purpose is disclosed in the patent to Dobrovolny et al. 2,174,554, October 3, 1939 "Colored Glass." Although, by the use of such compounds, better color and greater uniformity of color are obtained, their use is highly objectionable owing to the fact that they are deadly poisonous and extreme precautions must be taken in glass factories where such materials are handled. The history of their industrial use records many fatalities from ordinary handling of cyanide materials.

We have discovered that coal, ground to a suitable fineness and in suitable quantities as hereinafter set forth, may be used advantageously as a reducing agent in the manufacture of copper ruby glass. The ground coal is superior to materials such as charcoal and cream of tartar. Moreover, it is well adapted for use in open furnaces, whereas charcoal and cream of tartar are only adapted for use in closed pots or furnaces.

Our invention comprises the use of bismuth in small amounts in combination with the coal to maintain and control uniformity of color of the glass. We recognize that the use of bismuth in a formula for making ruby glass is not new per se, being disclosed, for example, in Patent Number 2,233,343, Dobrovolny et al., February 25, 1941, "Manufacture of Ruby Glass." In this patent however, the bismuth is used in comparatively large quantities or percentages and in combination with cyanide compounds.

The following is a sample glass batch formula which we have developed and used in the manufacture of glassware:

In the above formula, the weight of the ingredients forming the batch is given in pounds except the last item, Bismuth Subnitrate, given in ounces. The second and third columns give a quantitative analysis of the glass produced by said batch. The $Fe_2O_3$ and $TiO_2$ appear as impurities in the glass. This glass was processed through forming and handling equipment in use commercially in the manufacture of glass containers (bottles and jars). The blown glass articles were conveyed to an annealing lehr where the color was flashed at temperatures varying from 980 to 1060 degrees F. The articles were then subjected to normal annealing temperatures. The resultant color was a clear ruby, uniform throughout the articles.

The quantity of coal required in a batch formula such as above given, depends upon the composition and grain size of the specific coal used. A bituminous coal having a high fixed carbon content and a minimum of fine particles (passing through 140 mesh screen) we have found to be most desirable. The fine particles in the coal dust off or burn away before any appreciable reaction can occur with other batch materials. With regard to the use in a glass batch of carbon in finely divided form, it is to be observed that many prior art ruby glass batch formulas call for charcoal or cream of tartar. These formulas apply to the manufacture of ruby glass in closed pots and have been found unsuitable for use in open tanks. The above identified patents covering the use of cyanogen compounds and bismuth represent the first practical method of manufacturing copper ruby glass in continuous furnaces. The fact that cyanogen compounds are deadly poisons, even in very small quantities, renders their use definitely undesirable.

We have conducted experiments with batch melting for the purpose of determining the optimum quantity of powdered coal required as well as the influence of grain size. Two coals in the bituminous class, referred to respectively as No. 1 coal and No. 2 coal, having the following compositions, were used in these melts.

Formula

| | | | | Percent |
|---|---|---|---|---|
| Sand | 2000 | $SiO_2$ | | 71.92 |
| Soda Ash | 796.8 | $Al_2O_3$ | | 1.78 |
| Calcite Limestone | 508 | $Fe_2O_3$ | | .039 |
| Feldspar | 252.8 | $TiO_2$ | | .013 |
| Powdered Coal | 16 | CaO | | 9.32 |
| Cuprous Oxide | 2.4 | MgO | | .09 |
| Stannic Oxide | 6.4 | $Na_2O$ | | 16.53 |
| Bismuth Subnitrate | 3.6 to 6.8 oz. | Cu | | .071 |
| | | $SnO_2$ | | .213 |
| | | $Bi_2O_3$ | | .006 to .011 |

| | No. 1 coal | No. 2 coal |
|---|---|---|
| Ash | 12.30 | 7.87 |
| Total Sulphur | .80 | 1.77 |
| Sulphur Trioxide ($SO_3$) | .18 | .37 |
| Ferric Oxide ($Fe_2O_3$) in coal | .74 | 1.16 |
| Ferric Oxide ($Fe_2O_3$) in ash | 6.0 | 14.8 |
| Volatile Matter | 29.74 | 35.30 |
| Fixed Carbon | 58.0 | 56.8 |

A screen analysis of these coals showed the following proportions and grain sizes:

| Mesh | No. 1 coal | No. 2 coal |
|---|---|---|
| | Percent | Percent |
| +16 | 0.0 | 0.0 |
| +20 | 0.7 | 0.2 |
| +30 | 2.4 | 3.6 |
| +40 | 7.8 | 10.3 |
| +50 | 12.2 | 15.5 |
| +60 | 6.5 | 9.2 |
| +80 | 12.4 | 14.7 |
| +100 | 8.7 | 9.6 |
| +140 | 10.9 | 10.6 |
| −140 | 38.5 | 26.2 |

We found that it required 16 pounds of the No. 1 coal in the batch above given to develop a copper ruby glass comparable to that developed with the same batch containing only 12¾ lbs. of No. 2 coal. After screening out the fines, only 12¾ lbs. of the No. 1 coal was required.

The above batch, when melted in a continuous tank furnace without the addition of bismuth oxide, resulted in a glass with too critical a striking range. Bottles made with such glass were ruby colored following lehr treatment but were streaked and varied in color intensity. The glass was very sensitive to chilling; for example, it was not possible to strike color in the finish unless the lehr temperature was raised sufficiently to render the balance of the bottle opaque.

Prior to the addition of bismuth oxide, the glass easily developed opacity and a liverish color. This sensitive condition is also characteristic of a glass batch containing sodium cyanide either with or without the addition of bismuth oxide. Following the addition of a small quantity of bismuth to the batch containing coal, the tendency toward opacity or livering disappeared. An increase in flashing temperature resulted only in a further increase in the intensity of the ruby color. The temperature range for flashing a good ruby color is thus considerably wider than with the use of a cyanide-bismuth batch such as covered by the above noted patents.

Our experiments with crucible melts show that the tin oxide comprised in the above batch (formula) could be introduced as either stannous or stannic oxide without detrimental effects. Since stannous oxide is unstable, limited in supply and more expensive, the use of stannic oxide is preferred for the batch used in the continuous furnace.

Our invention is not limited to the use of any specific type of glass or any particular glass formula. A desirable ruby-colored glass can be made in a standard continuous container glass furnace using a base batch (soda—lime—silica) to which is added a stannous or stannic acid, cuprous oxide, and bismuth, using coal as a reducing agent. Referring to the above glass formula, the percentages of the batch ingredients may be varied with a resultant variation in the percentages of the glass components, as follows, namely: the $SiO_2$ may vary within practical limits from 68% to 72.5%; the $Al_2O_3$ from 5% to 3.0%; the CaO from 5.5% to 11.5%; the MgO from .05% to 6.0%; the $Na_2O$ from 14.5% to 17.0%; the Cu from .04% to .1%; the $SnO_2$ from .12% to .25%; the $Bi_2O_3$ as given in the formula, namely, from .006% to .011%. The $Bi_2O_3$ is preferably less than .01%.

The bismuth as introduced into the glass batch may be either in the form of a subnitrate or some other salt or compound containing bismuth. The bismuth is only used in the very small quantities necessary to control the color and give stability. The less the amount of bismuth, the longer the flashing temperature must be maintained to effect a given result. To produce the desired color, the temperature may be temporarily raised somewhat higher than the usual annealing temperature; for example, up to about 1000 degrees F. when the ware has been placed in the annealing lehr and then reduced to the normal usual annealing temperatures.

Although the sample coals above referred to are in the bituminous class, anthracite may be used or any coal of intermediate composition. The amount of coal required for optimum results would vary but would be within the range of from 12 to 24 lbs. per ton of sand or from .04 to .08% by weight of the finished glass. The quantity of bismuth oxide required would be under 0.01%, averaging from 0.006 to 0.008% of the finished glass. The amount of tin and copper oxide required may be varied within limits as heretofore pointed out in connection with the formula.

Amounts and percentages herein given are by weight.

Modifications may be restored to within the spirit and scope of our invention.

We claim:

1. The method of preparing a ruby glass which comprises adding a reducing agent consisting of granulated coal to a glass batch which includes as ingredients thereof a copper compound and a bismuth compound containing a substantial amount of bismuth equivalent to less than 0.01% $Bi_2O_3$, the amount of granulated coal being from .04% to .08% by weight of the finished glass, and fusing said batch in an open furnace.

2. The method of preparing ruby glass which comprises adding a reducing agent consisting of granulated coal to a glass batch which includes as ingredients thereof a copper compound and a bismuth compound containing an amount of bismuth equivalent within the range of about 0.006% to 0.01% $Bi_2O_3$, the amount of granulated coal being from .04% to .08% by weight of the finished glass, and fusing said batch in an open furnace.

EDWARD M. LOBDELL.
JOSEPH W. WRIGHT.

References Cited in the file of this patent

UNITED STATES PATENTS

| Number | Name | Date |
|---|---|---|
| 2,174,554 | Dobrovalny et al. | Oct. 3, 1939 |
| 2,233,343 | Dobrovalny et al. | Feb. 25, 1941 |